US006678931B1

(12) United States Patent
Tatasciore

(10) Patent No.: US 6,678,931 B1
(45) Date of Patent: Jan. 20, 2004

(54) DISK BRAKE TOOL

(76) Inventor: Christopher Tatasciore, P.O. Box 1693, Loomis, CA (US) 95650

( * ) Notice: Subject to any disclaimer, the term of this patent is extended or adjusted under 35 U.S.C. 154(b) by 0 days.

(21) Appl. No.: 10/261,841

(22) Filed: Sep. 30, 2002

(51) Int. Cl.[7] .................................................. B23P 19/04
(52) U.S. Cl. .......................................................... 29/239
(58) Field of Search ........................ 29/239, 266; 269/6; 254/108

(56) References Cited

U.S. PATENT DOCUMENTS 6,523,238 B1 * 2/2003 Priddy ......................... 29/239

* cited by examiner

*Primary Examiner*—Robert C. Watson
(74) *Attorney, Agent, or Firm*—Risto A. Rinne, Jr.

(57) ABSTRACT

An apparatus for the compression of a piston of a disk brake housing into a cylinder includes a caliper gun frame, a lever attached to the frame, a rod that extends forward and away from a user as the lever is squeezed, a hollow extension shaft attached to the frame and disposed over a portion of the rod, a retaining plate attached to a distal end of the extension shaft, a compression disk attached to a distal end of the rod and an actuating assembly attached to the frame and affected by the lever that displaces the rod in a first forward direction as the lever is squeezed. The device is positioned intermediate an inside surface of the housing and the piston whereby the compression disk bears against a top exposed surface of the piston and urges the piston into the cylinder as the lever is squeezed an amount sufficient to replace a pair of disk brake pads.

12 Claims, 1 Drawing Sheet

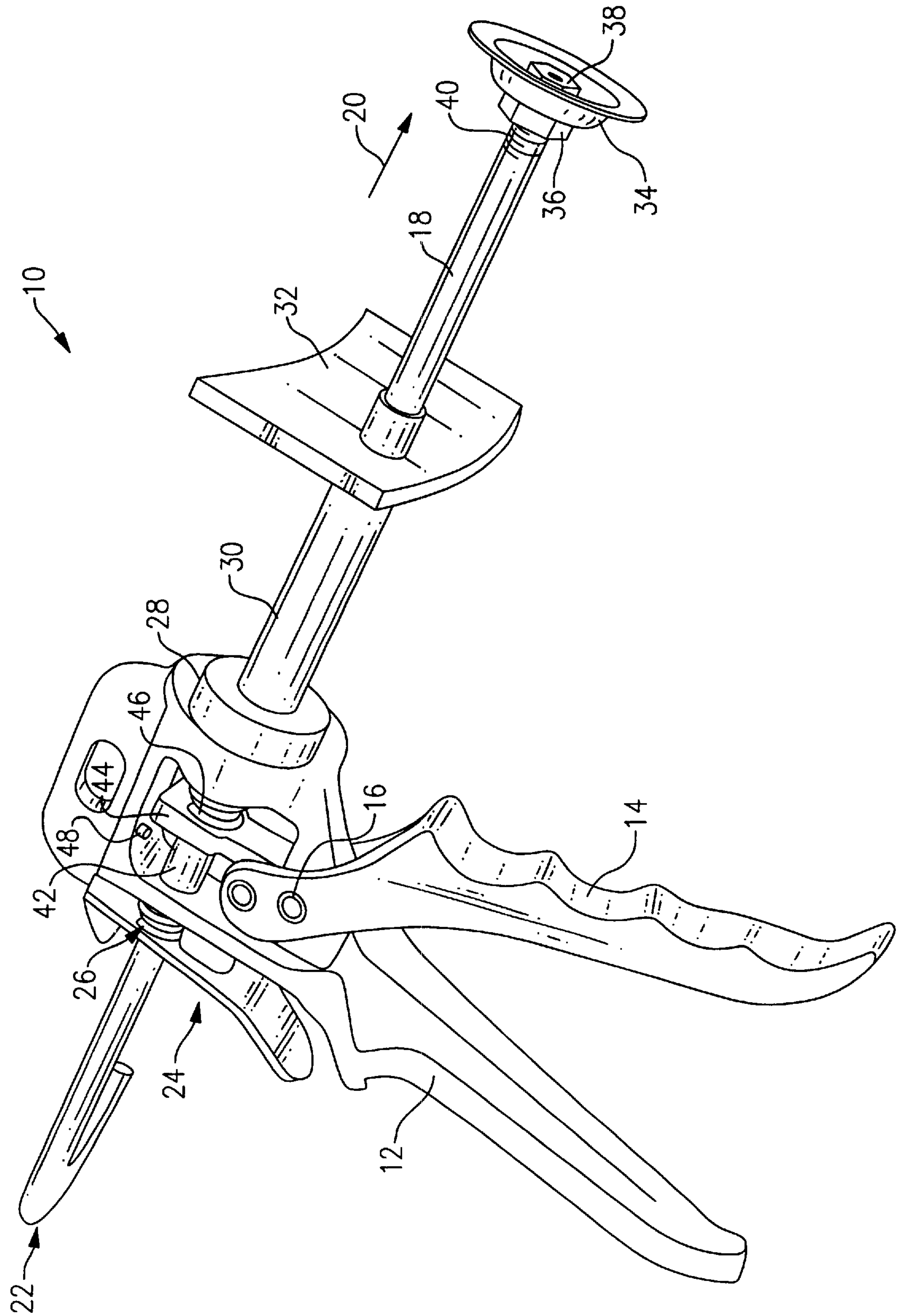
10
12
14
16
18
20
22
24
26
28
30
32
34
36
38
40
42
44
46
48

DISK BRAKE TOOL

BACKGROUND OF THE INVENTION

1. Field of the Invention

The present invention, in general relates to automobile repair devices and, more particularly, to devices that are used to aid in replacing the pads of a disk brake.

Disk (or disc) brakes are well known and provide many benefits. It is necessary to replace the pads that are used with disk brakes from time to time. In order to do so, a piston in a caliper (i.e., a cylinder) must be pushed back into the caliper to make room to extract the worn pads and especially to allow room for the new pads to be installed. The new pads are thicker than the worn pads and, accordingly, the piston must be retracted an amount that is sufficient to accommodate the thicker replacement pads.

Prior art devices rely upon lead screws that push one of the pads outward, thereby retracting the piston into the caliper. The caliper normally includes one cylinder that pushes one of the pads toward a disk that is attached to a wheel of a vehicle and is disposed intermediate a second opposite pad. The caliper is disposed on a rail and is able to move from side to side and so the two pads are always aligned on opposite sides of the disk.

The only force that typically retracts the cylinder is any pressure exerted on the pads by the disk itself as it bears against the pads. This force then pushes the pads outward so that they are not in contact with the disk when brake pressure is removed (i.e., when a driver is no longer braking). The piston is retracted a small amount back in the caliper. As the pads wear, the piston may extend over one-half of an inch further out from the caliper than it did when the pads were new. Only a very small amount of retraction of the piston into the caliper normally occurs.

Accordingly, as the pads wear the piston extends as needed and the caliper automatically aligns itself so that the worn pads are disposed proximate the disk on each side thereof. To replace worn pads, the piston must be retracted fully back into the caliper.

Tools have been designed to do this but they tend to be either slow to use or expensive to purchase. Also, they typically require two hands to operate. Some such tools rely upon a lead screw that must be rotated. A rotational motion makes this process especially awkward to accomplish.

It is also desirable to be able to progressively vary the rate of retraction. Sometimes, the user will want to quickly retract the piston, such as when the pads are to be removed as quickly as possible. At other times, the user will want to steadily and slowly retract the piston, such as when the system is being tested for leaks or other failure modes.

Also, it is important to be able to stop retracting the piston and to maintain it at a particular position, for example when applying pressure to the brake pedal or otherwise testing the braking system.

Accordingly, there exists today a need for a disk brake tool that is able to easily and quickly retract a piston into a caliper and which is inexpensive to manufacture.

Clearly, such an apparatus would be a useful and desirable device.

2. Description of Prior Art

Brake tools are, in general, known. For example, the following patents describe various types of these devices:

U.S. Pat. No. 6,378,185 to Ratchovsky et al, Apr. 30, 2002;

U.S. Pat. No. 6,192,566 to Dunum, Feb. 27, 2001;

U.S. Pat. No. 5,479,689 to Schmitt et al., Jan. 2, 1996;

U.S. Pat. No. 5,018,261 to Markous, May 28, 1991; and

U.S. Pat. No. 3,835,522 to Ward, Sep. 17, 1974.

U.S. Pat. No. Design 457,795 to Mohammed et al., May 28, 2002.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

U.S. Pat. No. 3,705,581 to Drake, that issued Dec. 12, 1972 is a cast-spreading device that is known to the inventor but which solves a materially different purpose and is therefore not believed to be related to the field of the instant invention. It also fails to include elements that are essential to the functioning of the instant invention.

OBJECTS AND SUMMARY OF THE INVENTION

It is an object of the present invention to provide a disk brake tool that is economical to manufacture.

It is also an important object of the invention to provide a disk brake tool that is easy to use.

Another object of the invention is to provide a disk brake tool that is fast to use.

Still another object of the invention is to provide a disk brake tool that allows for a steady readily controllable progressive retraction of a cylinder into a brake caliper.

Still yet another object of the invention is to provide a disk brake tool that requires only one hand to operate, thereby freeing up a remaining hand.

Yet another important object of the invention is to provide a disk brake tool that does not introduce a rotational force.

Still yet another important object of the invention is to provide a disk brake tool that is able to hold the piston in a retracted position in the caliper at any location once pressure is removed from the tool.

Briefly, a disk brake tool that is constructed in accordance with the principles of the present invention includes a caliper gun frame, a lever attached to the frame, a rod that extends forward and away from a user as the lever is squeezed, a hollow extension shaft attached to the frame and disposed over a portion of the rod, a retaining plate attached to a distal end of the extension shaft, and a disk attached to a distal end of the rod.

BRIEF DESCRIPTION OF THE DRAWINGS

The FIGURE is a view in perspective of a disk brake tool.

DETAILED DESCRIPTION OF THE INVENTION

Referring to the drawing figure is shown, a disk brake tool, identified in general by the reference numeral 10.

A caliper gun frame 12, similar to the caliper gun frames used in the manufacture of caulking guns (not shown) includes a lever 14 that is attached to the frame 12 and adapted to pivot about a pin 16 on an axis.

During use, as is described in greater detail hereinafter, a hand of a user (not shown) includes a thumb and palm area that wraps around a lower portion of the frame 12 and a plurality of fingers that wrap around the lever 14. The fingers are periodically urged toward the palm and thumb thereby pivoting the lever 14 about the pin 16 and drawing the lower portion of the lever 14 closer to the lower portion of the frame 12.

The force that is applied to the fingers is then released and the lever 14 is urged by a frame-mounted first spring (not shown) to automatically extend out and away from the lower portion of the frame 12. This motion is then repeated as desired to extend a rod 18 in a first direction shown by a first arrow 20. This is described in greater detail hereinafter.

The rod 18 extends through the frame 12 and includes a curved portion 22 proximate a rear end thereof. The rod 18 is typically from twelve to fourteen inches long and includes a diameter from one-quarter to three-eighths of an inch.

The curved portion 22 is useful in retracting the rod 18 from an extended position (i.e., when the rod 18 is displaced in the first direction of the first arrow 20) to a retracted position (i.e. when the rod 18 is displaced in a second direction that is opposite to that of the first arrow 20).

The curved portion 22 is grabbed and pulled in a direction that is opposite to that of the first arrow 20 to retract the rod 18 while simultaneously depressing a rod lock lever 24. A second spring 26 normally urges the rod lock lever 24 away from the frame 12, thereby ensuring that the rod 18 cannot be retracted.

The rod lock lever 24 is attached to the rear of the frame 12 and is designed to hold the rod 18 in position when it is not being advanced (i.e., urged) in the first direction.

The rod lock lever 24 includes a hole through which the rod 18 passes. The rod lock lever 24, unless acted on by an outside force, is normally held at an angle with respect to a longitudinal axis of the rod 18 due to the force exerted upon it by the second spring 26. The angle allows the rod 18 to extend in the first direction and prevents it from retracting in the second direction.

When the rod lock lever 24 is depressed (i.e. squeezed), the lower portion pivots toward the frame 12. As a result, the angle is changed and becomes nearly perpendicular with respect to the longitudinal axis of the rod 18. The hole, which is larger than the diameter of the rod 18, no longer binds against the rod 18, thereby allowing the rod 18 to be retracted, as desired.

A stop flange and jambnut assembly 28 attach to the frame 12 at a front end thereof. An extension shaft 30 includes a hollow core that has a diameter that is greater than the diameter of the rod 18. Accordingly, the rod 18 is adapted to slide longitudinally back and forth through the shaft 30.

The shaft 30 includes a threaded end proximate the frame 12 that is threaded into the stop flange and secured by the jambnut (identified together by reference numeral 28). Accordingly, the shaft 30 is prevented from being displaced any closer toward the frame 12 than is allowed by the position of the stop flange and jambnut assembly 28 which bears against the frame 12.

An arcuate plate 32 is generally a rectangular plate having a slight radius. The arcuate plate 32 is attached to the shaft 30 at a distal end with respect to the frame 12.

The rod 18 passes through the flange and jambnut assembly 28, the shaft 30, and the arcuate plate 32 and extends further in the first direction.

The shaft 30 is typically about three inches in length and includes an outside diameter of approximately five-eighths of an inch. The arcuate plate 32 is threaded to the shaft 30.

The shaft 30 is required for operation of the disk brake tool 10 because it disposes the frame 12 sufficiently far away from a disk brake housing (described in greater detail hereinafter) to allow squeezing of the lever 14 and subsequent proper operation of the disk brake tool 10. Otherwise, the lever 14 would contact the housing and be retained in the squeezed position, unable to extend away from the frame 12.

A compression disk 34 is attached to a forward end of the rod 18. The disk 34 includes a second hole in the center that passes over the rod 18. The disk 34 is secured by tightening a pair of nuts 36, 38 toward each other that mate with threads 40 at the end of the rod 18 and which are disposed on opposite sides of the disk 34.

A first portion of the lever 14 extends above the pin 16 and is substantially shorter than a remaining second portion that extends below the pin 16. Accordingly, when the lever 14 is squeezed, a mechanical force advantage is applied to the first portion that moves it in the first direction.

The rod 18 is displaced in the forward first direction when the lever 14 is squeezed by an actuating assembly that includes a bushing 42, a friction plate 44, and a tension spring 46. The rod 18 passes through an opening in the friction plate 44.

The friction plate 44 is normally disposed in a near perpendicular attitude (i.e., when the lever 14 is not being squeezed) with respect to the longitudinal axis of the rod 18 by a force that is applied to the friction plate 44 by the tension spring 46 that tends to urge it (the friction plate 44) rearward in the second direction.

The rearward displacement of the friction plate 44 by the tension spring 46 is limited at the top of the friction plate 44 by it making contact with a protrusion 48 in the frame 12 and at the bottom by it making contact with the first portion of the lever 14 which, when the lever 14 is fully released, provides the perpendicular attitude of the friction plate 44. The rearward displacement of the friction plate 44 by the tension spring 46 is also limited by contact with the bushing 42.

The opening is larger than the diameter of the rod 18 and therefore it does not impede motion of the rod 18 in either the first or the second direction when the lever 14 is released (i.e., when the lever 14 is not being squeezed).

When the lever 14 is squeezed, it bears upon a lower portion of the friction plate 44 and the bottom of the friction plate 44 is at first urged forward in the first direction.

Accordingly, the opening binds against the bottom of the rod 18 as the friction plate 44 pivots away from perpendicular and, as the lever 14 is further squeezed, the friction plate 44 urges the rod 18 forward in the first direction as well. The reason the top of the friction plate 44 does not also move forward is because it is maintained in its rearward position against the protrusion 48 by the tension spring 46.

This arrangement provides for the steady progressive advancement of the rod 18 in the first direction as the lever 14 is progressively squeezed. If substantial resistance to the forward motion of the rod 18 is experienced, the friction plate 44 responds by further binding against the rod 18 as increased pressure is applied to the lever 14 in response to the increased resistance.

Accordingly, the rod 18 can be used to supply a substantial force in the first direction that far exceeds the force that is applied to the lever 14. It also provides great "feel" to a user who can precisely feel changes in resistance as well as precisely control the amount of forward movement by the rod 18 by controlling the amount that the lever 14 is squeezed.

When the lever 14 is fully released the friction plate 44 is again urged rearward in the perpendicular attitude. The rod 18 is subsequently prevented from retracting in the second direction by the effect of the rod lock lever 24 which retains it in position. Accordingly, a plurality of cycles of squeezing and releasing the lever 14 are used to advance the rod 18 in the first direction a desired amount.

This can all be done by using only one hand to both hold and operate the lever 14 of the disk brake tool 10. When the rod 18 has been urged in the first direction a desired amount, the one hand is released from the lever 14 and the disk brake tool 10 remains in its desired extended position until the rod lock lever 24 is depressed and the curved portion 22 is pulled in the second direction.

This action retracts the rod 18 and releases the disk brake tool 10 from a position of cooperation with a disk brake caliper housing (not shown) and a brake piston (not shown). Those skilled in the art of replacing disk brake pads will readily understand the use of the disk brake tool 10 from the descriptions herein. Accordingly, the details of the disk brake caliper housing, which is well known for use with disk types of brakes, are not shown or expounded upon.

During use, the rod 18 is fully retracted in the second direction until the compression disk 34 is disposed near the arcuate plate 32. The disk brake tool 10 is then aligned for use with the rod 18 passing through a recess that is formed in the disk brake caliper frame housing.

A rear of the arcuate plate 32 is disposed against an inside surface of the disk brake caliper frame housing. The inside surface is normally curved and the curvature of the arcuate plate 32 cooperates well with the inside surface.

The compression disk 34 is disposed intermediate the piston and the inside surface. The lever 14 is then repeatedly squeezed to urge the rod 18 in the first direction until the compression disk 34 makes contact with the piston. The lever 14 is then repeatedly squeezed an amount sufficient to retract the piston into a cylinder portion of the disk brake caliper frame housing. When the piston is fully retracted into the cylinder, the brake pads can easily be replaced.

During normal use after the piston has been fully retracted back into the cylinder, the disk brake tool 10 is then removed from a position of cooperation with the piston and the inside surface of the disk brake caliper frame housing. This removal is possible because the piston will not extend out of the cylinder unless a force urges it to do so. The force to do so is generated only when a brake pedal in a vehicle is depressed—which is not permitted at this time.

It is also both possible and well known in the art to leave one of the two brake pads in its normal position adjacent to the piston when retracting the piston. When using the disk brake tool 10, the compression disk 34 is disposed against the one brake pad and the lever 14 is repeatedly squeezed to urge both the one brake pad and the piston, against which it bears, back into the cylinder. When the disk brake tool 10 is removed from the housing, the remaining one brake pad is then removed as well and the new brake pads are installed.

When the brake lines are bled (to remove air pockets) or when the brake system is otherwise tested, it is desirable to retain the disk brake tool 10 in a position of cooperation with the piston and the inside surface of the disk brake caliper frame housing.

Increased pressure can be applied to the brake lines by retracting (i.e., forcing) the piston further into the cylinder or retaining it in position and depressing the brake pedal and then testing for leaks, etc. Additional pressure may then be applied by further retracting the piston into the cylinder or applying more pressure to the brake pedal.

When the test is complete or after the brake lines have been bled, the disk brake tool 10 is then removed from the housing, the rod 18 is retracted and the disk brake tool 10 is ready for further use. Accordingly, the disk brake tool 10 is shown to provide utility beyond that of merely retracting the piston an amount sufficient to replace the brake pads.

Similarly, although only one version of the actuating assembly is described, many variations are possible. For example, instead of the binding mechanism that is described, a modified rod (not shown) can be used that includes a ratcheted surface, as is well known in certain types of caulking guns.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

Although not mentioned herein, the dimensions of any component part of the disk brake tool 10 may be varied to suit the application at hand. For example, truck disk brakes may require a larger, stronger version than would a small import type of vehicle. Similarly, any material may be used as are other obvious design variations anticipated, for example changing the rod 18 from having a circular cross-section to one that is rectangular, etc.

As was mentioned hereinabove, the disk brake tool 10 provides the user with exceptional “feel” of changes in resistance to the forward progress of the rod 18. This is especially useful when there is a problem. If the piston is not properly being retracted into the cylinder or if some other problem occurs, the user is able to readily detect an unusually high resistance by the feel of the device. The user then stops squeezing the lever 14, determines, and remedies the situation as needed before proceeding. This helps to avoid causing further damage to any brake system component.

What is claimed is:

1. A disk brake tool that is adapted for retracting a piston into a cylinder of a disk brake housing, comprising:

(a) a frame;

(b) a rod that is retained in a cooperative relationship with said frame, said rod having a first end and a second end wherein said second end of said rod is adapted to move longitudinally in a first direction away from said frame and in a second direction toward said frame;

(c) means for urging said rod in said first direction; and including an extension shaft, said extension shaft including a hollow interior and being disposed over a portion of said rod, said rod adapted to move longitudinally through said extension shaft, said extension shaft including a first end and an opposite second end, said first end attached to said frame and an arcuate plate attached at said second end, said arcuate plate adapted to bear against an inside surface of said disk brake housing and said rod adapted to move longitudinally through said arcuate plate;

wherein said rod is adapted to retract said piston into said cylinder when said rod is urged in said first direction.

2. The disk brake tool of claim 1 wherein said means for urging said rod in said first direction includes an actuating assembly.

3. The disk brake tool of claim 2 wherein said means for urging said rod in said first direction includes a lever that is pivotally attached to said frame.

4. The disk brake tool of claim 3 wherein said actuating assembly includes a friction plate adapted to pivot from a first position into a second position subsequent to a force being applied to a lower portion of said lever sufficient to urge said lever to pivot about an axis wherein said lower portion is urged toward a lower portion of said frame and wherein said second position is adapted to urge said rod in said first direction subsequent to a continued urging of said lower portion of said lever toward said lower portion of said frame.

5. The disk brake tool of claim 4 including a tension spring that is adapted to urge said friction plate into said first position subsequent to a removal of any force being applied to said lower portion of said lever.

6. The disk brake tool of claim 1 including means for retaining said rod at a predetermined position along said longitudinal axis.

7. The disk brake tool of claim 6 wherein said means for retaining includes a rod lock lever pivotally attached to said frame and adapted to pivot intermediate a first rod lock position and a second rod lock position and means for retaining said rod lock lever in said first rod lock position, said first rod lock position adapted to prevent said rod from moving in said second direction and said second rod lock position adapted to allow said rod to move in said second direction.

8. The disk brake tool of claim 1 wherein said rod includes a compression disk attached to a distal end thereof, said compression disk adapted to bear against a member sufficient to retract said piston into said cylinder when said rod is urged in said first direction.

9. The disk brake tool of claim 8 wherein said member includes an exposed surface of said piston.

10. The disk brake tool of claim 8 wherein said member includes a brake pad and wherein said brake pad is adapted to contact said piston.

11. The disk brake tool of claim 1 wherein said rod includes a compression disk attached to a distal end thereof, said compression disk adapted to retract said piston into said cylinder when said arcuate plate is disposed against said inside surface and said rod is urged in said first direction.

12. The disk brake tool of claim 1 wherein said means for urging said rod in said first direction includes an actuating assembly and wherein said actuating assembly is adapted to urge said rod in said first direction subsequent to a force being applied thereto by a hand of a user and including means for retaining said rod at a predetermined position along said longitudinal axis subsequent to a removal of said force from said actuation assembly.

* * * * *